United States Patent
Prasad et al.

(10) Patent No.: US 6,537,514 B1
(45) Date of Patent: Mar. 25, 2003

(54) METHOD AND APPARATUS FOR PRODUCING CARBON DIOXIDE

(75) Inventors: Ravi Prasad, E. Amherst, NY (US); Christian Friedrich Gottzmann, Clarence, NY (US); Nitin Ramesh Keskar, Lewisville, TX (US); Joseph Michael Schwartz, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/427,066

(22) Filed: Oct. 26, 1999

(51) Int. Cl.⁷ .............................................. C01B 31/20
(52) U.S. Cl. .................................................. 423/437.1
(58) Field of Search .................... 423/437.1; 60/39.06, 60/39.02

(56) References Cited

U.S. PATENT DOCUMENTS

| | | | |
|---|---|---|---|
| 4,545,787 A | 10/1985 | Hegarty | 55/16 |
| 5,035,727 A | 7/1991 | Chen | 55/16 |
| 5,306,411 A | 4/1994 | Mazanec et al. | 204/265 |
| 5,516,359 A | 5/1996 | Kang et al. | 95/14 |
| 5,547,494 A | 8/1996 | Prasad et al. | 95/54 |
| 5,562,754 A | 10/1996 | Kang et al. | 95/54 |
| 5,565,017 A | 10/1996 | Kang et al. | 95/14 |
| 5,820,655 A | 10/1998 | Gottzmann et al. | 95/54 |
| 5,837,125 A | 11/1998 | Prasad et al. | 205/763 |
| 5,976,223 A | * 11/1999 | Prasad et al. | 95/54 |
| 6,117,210 A | * 12/2000 | Prasad et al. | 95/54 |

* cited by examiner

*Primary Examiner*—Stuart L. Hendrickson
(74) *Attorney, Agent, or Firm*—David M. Rosenblum (57) ABSTRACT

In a method for the production of carbon dioxide, an oxygen-containing first process gas is flowed along a cathode side of a first oxygen selective ion transport membrane. The membrane is at operating conditions effective to transport a first permeate oxygen portion from the cathode side to an opposite anode side. A carbon-containing second process gas is flowed along the anode side at a flow rate effective to provide a stoichiometric surplus of oxygen on combination with the first permeate oxygen portion. A first mixture of a second process gas and the first permeate oxygen portion is combusted such that substantially all of the second process gas is converted into a second mixture of water and carbon dioxide. The carbon dioxide is separated from such second mixture.

19 Claims, 5 Drawing Sheets

METHOD AND APPARATUS FOR PRODUCING CARBON DIOXIDE

U.S. GOVERNMENT RIGHTS

This invention was made with United States Government support under Cooperative Agreement No. 70NANB5H1065 awarded by the National Institute of Standards and Technology. The United States Government has certain rights in the invention.

FIELD OF THE INVENTION

This invention relates to the use of solid electrolyte ionic conductor systems, and in particular to oxygen-selective ion transport membranes (OTM's) in gas separation systems and most particularly to the use of OTM's in gas purification systems.

BACKGROUND OF THE INVENTION

Non-cryogenic bulk oxygen separation systems, for example, organic polymer membrane systems, have been used to separate selected gases from air and other gas mixtures. Air is a mixture of gases which may contain varying amounts of water vapor and, at sea level, has the following approximate composition by volume: oxygen (20.9%), nitrogen (78%), argon (0.94%), with the balance consisting of other trace gases. An entirely different type of membrane, however, can be made from certain inorganic oxides. These solid electrolyte membranes are made from inorganic oxides typified by calcium- or yttrium-stabilized zirconium and analogous oxides having a fluorite or perovskite structure.

Although the potential for these oxide ceramic materials as gas separation membranes is great, there are certain problems in their use. The most obvious difficulty is that all of the known oxide ceramic materials exhibit appreciable oxygen ion conductivity only at elevated temperatures. They usually must be operated well above 500° C., generally in the 900° C. to 1100° C. range. This limitation remains despite much research to find materials that work well at lower temperatures. Solid electrolyte ionic conductor technology is described in more detail in Prasad et al., U.S. Pat. No. 5,547,494, entitled Staged Electrolyte Membrane, which is incorporated by reference in its entirety herein to more fully describe the state of the art. The elevated temperatures of operation, however, make ion transport processes intrinsically well suited for integration with high temperature processes such as vapor-based, gas-based, or combined power cycles.

Recent developments have produced solid oxides which have the ability to conduct oxygen ions at elevated temperatures if a chemical driving potential is applied. The chemical driving potential is established by maintaining an oxygen partial pressure difference across the material. These pressure-driven ionic conductor materials may be used as membranes for the extraction of oxygen from oxygen-containing gas streams if a sufficiently high ratio of oxygen partial pressures is applied to provide the chemical driving potential. Namely, the oxygen partial pressure is maintained at a higher value on the cathode side of the membrane, that is exposed to the oxygen-containing gas, than on the anode-side, where oxygen transported through the material is recovered.

The membranes have "oxygen selectivity". Oxygen selectivity is the tendency of the membrane to transport oxygen ions in preference to other elements and ions thereof. Since the selectivity of these materials for oxygen is infinite (a total preference for transporting oxygen ions to the exclusion of other ions), and oxygen fluxes several orders of magnitude higher than that for polymeric membranes can be obtained, attractive opportunities are created for the production of oxygen as well as for oxygen-requiring oxidation processes, especially with applications that involve elevated temperatures. A prominent example is gas turbine cycles which typically process a significant amount of excess air to keep the turbine inlet temperature within the capabilities of available materials and therefore make available excess oxygen for recovery as a co-product.

Some of the key problems that have to be addressed in the design of ion transport membrane systems and their integration into a high temperature cycle such as a gas turbine involve maximizing driving forces for ion transport, minimizing gaseous diffusion resistance, avoiding excessive stresses from thermal and compositional expansion and contraction and sealing the ion transport elements within the ion transport apparatus. The latter problem is aggravated by ion transport membrane operating temperatures being in the range from 800° C. to 1100° C.

Advances in the state of the art of air separation using solid electrolyte ionic conductors have been presented in the technical literature. For example, Mazanec et al., U.S. Pat. No. 5,306,411, entitled Solid Multi-Component Membranes, Electrochemical Reactor Components, Electrochemical Reactors and Use of Membranes, Reactor Components, and Reactor for Oxidation Reactions, relates to electrochemical reactors for reacting an oxygen-containing gas with an oxygen-consuming gas and describes a shell and tube reactor with the oxygen-consuming gas flowing on one side of the solid electrolytic membrane and the oxygen consuming gas on the other. Mazanec et al., however, does not address issues related to integrating such systems with oxygen production from gas turbine cycles, heat management to maintain membrane surfaces at the desired uniform temperatures, flow dynamics to achieve effective mass transfer, or the need for balancing reaction kinetics with oxygen ion conductivity to maintain the appropriate oxygen partial pressure for materials stability.

Gottzmann et al., U.S. Pat. No. 5,820,655, entitled Solid Electrolyte Ionic Conductor Reactor Design, describes an ion transport reactor and process using an ion transport membrane for extracting oxygen from a feed gas stream flowing along its retentate side. A reactant gas flows along the permeate side to react with the oxygen permeated through the membrane. Provisions are included to transfer the heat of the anode side reaction to a fluid stream flowing through the reactor in a fashion which maintains the membrane operating temperature within its operating range. The patent is silent on the recovery of carbon dioxide from the reacted permeate stream.

Prasad et al., U.S. Pat. No. 5,837,125, entitled Reactive Purge for Solid Electrolyte Membrane Gas Separation, describes a system and process for obtaining high purity oxygen-free products from an oxygen containing feed stream by permeating the contained oxygen to the permeate side of an oxygen ion transport membrane where the permeated oxygen reacts with a reactant purge stream to establish a low partial oxygen pressure at the anode. This permits removal of oxygen down to very low concentrations. The patent is silent on production and recovery of carbon dioxide.

Kang et al., U.S. Pat. No. 5,565,017, entitled High Temperature Oxygen Production with Steam and Power Generation, relates to a system integrating an ion transport membrane with a gas turbine to recover energy from the retentate gas stream after it is heated and steam is added. The retentate gas stream is the stream on the cathode side of the membrane following contact with the membrane wherein a portion of the elemental oxygen is transported through the membrane, while a permeate gas stream is on the anode side and receives such transported oxygen. Oxygen transported across the membrane from the cathode side to the anode side is designated as permeate oxygen or a permeate oxygen portion of the oxygen initially contained on the cathode side. The injection of steam or water into the ion transport retentate stream compensates for the loss of the oxygen mass from the turbine feed gas stream.

Kang et al., U.S. Pat. No. 5,562,754, entitled Production of Oxygen By Ion Transport Membranes with Steam Utilization, discloses a system integrating an ion transport membrane with a gas turbine to recover energy from the retentate gas stream after it is heated. Steam is added as a sweep gas on the anode side to enhance oxygen recovery. A stream containing a mixture of oxygen and steam is produced on the anode side which can be withdrawn as a product.

Kang et al., U.S. Pat. No. 5,516,359, entitled Integrated High Temperature Method for Oxygen Production, describes heating a compressed air feed gas stream to the appropriate ion transport operating temperature by a first combustor which, in one embodiment, is inserted between the compressor discharge and the ion transport separator. Subsequently, the retentate gas stream from the ion transport separator is heated to turbine inlet temperature by a second combustor. The inlet temperatures to the turbine and to the ion transport separator are independently controlled by adjusting the fuel rates to the two combustors. In an alternate configuration, a heat exchanger is placed between the two combustors, which are both located downstream from the ion transport separator, and the air feed gas stream to the ion transport separator is heated to the correct temperature by this heat exchanger.

The method disclosed in the Kang et al. '359 patent has the disadvantage that the feed gas stream to the ion transport separator contains products of combustion which dilute the ion transport separator feed gas stream, reduce the oxygen driving force, and could act as an adverse contaminant to some mixed conductor materials. Because some of the oxygen contained in the feed air is consumed in the first combustor, the oxygen driving force is further reduced. The alternative configuration has the disadvantage of requiring an additional, potentially expensive, heat exchanger. Either method could also have a problem maintaining stable combustion in the first combustor since the fuel-to-air equivalence ratio will be low, especially where the heat contained in the turbine exhaust is regeneratively recovered by the feed air gas stream and the heat duty of the first combustor is small.

Hegarty, U.S. Pat. No. 4,545,787, entitled Process for Producing By-Product Oxygen from Turbine Power Generation, relates to a process for generating net power using a combustion turbine, accompanied by the recovery of by-product oxygen-enriched gas. Air is compressed and heated, at least a portion of the air is combusted, and a portion of the oxygen is removed from the air or combustion effluent using an air separator. The oxygen lean combustion effluent is expanded through a turbine to produce power. In an alternative embodiment, the effluent from the turbine is used to produce steam to generate additional power. In this process, the type of fuel is generally limited to "clean" fuels such as natural gas, oils, or synthesis gas. The term synthesis gas ("syngas") means a mixture consisting essentially of hydrogen and carbon monoxide and often additional impurities with a molar ratio of hydrogen to carbon monoxide of from about 0.6 to about 6. Syngas is a common intermediate in the conversion of natural gas into liquid fuels such as methanol, formaldehyde and olefins.

Chen, U.S. Pat. No. 5,035,727, entitled Oxygen Extraction from Externally Fired Gas Turbines, relates to a process for recovering high purity oxygen from an externally fired power generating gas turbine cycle.

While this process is similar to the Hegarty '787 patent, Chen differs in the use of an externally fired gas turbine so that other types of fuel such as coal or biomass may be used.

OBJECTS OF THE INVENTION

It is therefore an object of the invention to provide a process for production of carbon dioxide. It is a further object of the invention to provide the carbon dioxide in a relatively pure form.

It is a further object of the invention to provide effective heat management of the reactors utilized to produce the carbon dioxide.

It is a further object of the invention to provide such a process which is economically efficient to manufacture and operate. It is a further object of the invention to achieve such efficiency via appropriate cogeneration of energy and/or additional useful products such as nitrogen and oxygen.

SUMMARY OF THE INVENTION

In a first aspect, the apparatus is directed to a method for the production of carbon dioxide. An oxygen-containing first process gas is flowed along a cathode side of a first oxygen selective ion transport membrane. The membrane is at operating conditions effective to transport a first permeate oxygen portion from the cathode side to an opposite anode side. A carbon-containing second process gas is flowed along the anode side at a flow rate effective to provide fuel lean conditions that is at a stoichiometric surplus of oxygen for reacting with the first permeate oxygen portion. A first mixture of the second process gas and the first permeate oxygen portion is combusted such that substantially all of the second process gas is converted into a second mixture of water and carbon dioxide. The carbon dioxide is separated from such second mixture.

In preferred embodiments of this first aspect, the carbon-containing second process gas may be selected from the group consisting of hydrocarbons, carbon monoxide, alcohols and mixtures thereof. Such second process gas may be a paraffinic hydrocarbon. A purge gas may be combined with the second process gas prior to the combusting. The purge gas may be steam. The combustion may be conducted downstream of the first anode side within the permeate passage of the reactor or downstream from the reactor.

A portion of a first retentate portion of the first process gas may be flowed along a cathode side of a second membrane, having opposite second cathode and anode sides, that is at operating conditions effective to transport a second permeate oxygen portion from the second cathode side to the second anode side. A product gas may be recovered from a second retentate portion. The product gas may be selected from the group consisting of nitrogen, argon, and mixtures thereof. A second reactive purge gas may be flowed along the second anode side. The second purge gas may contain a low grade fuel gas and diluent gases selected from the group consisting of steam and a remainder of the second retentate portion. The second reactive purge gas may be reacted with the second permeate oxygen portion in a complete or partial oxidation reaction. A product of the partial oxidation reaction may be flowed along the first anode side. The second reactive purge gas may be natural gas and syngas may be recovered as a product of the partial oxidation reaction. One of the advantages of the arrangement is that the second stage may be operated under fuel rich conditions to assure more complete removal of oxygen from the second retentate stream.

In a second aspect, the invention is directed to a process for the cogeneration of carbon dioxide, nitrogen and electrical power. A pressurized oxygen-containing first process gas is flowed along a cathode side of a first oxygen selective ion transport membrane that is operating at conditions effective to transport a first permeate oxygen portion from the cathode side to an opposing anode side. A purge gas optionally containing fuel is introduced to the anode side at an elevated pressure to purge the anode of the ion transport membrane. Flow of the anode side gas has to be countercurrent or cross-countercurrent to that of the cathode side stream. As a result the partial pressure of oxygen at the anode is reduced and a mixture of oxygen and carbon dioxide exits the permeate side. The oxygen contained in the mixture is reacted with fuel in a downstream combustor to form pressurized combustion products consisting primarily of carbon dioxide and steam. Optionally the combustor may be partly or totally integrated with the ion transport membrane by adding fuel to the gas stream entering the anode side. The advantage of integrating part or all of the combustor with the ion transport membrane is increased driving force for oxygen transport. The disadvantage of complete integration is that the peak temperature of the combustion products leaving the membrane unit is limited by the maximum operating temperature of the membrane rather than the turbine which is higher. The gas mixture exiting the combustor at elevated pressure and temperature is subsequently expanded in a gas turbine to generate electric power and exits at a lower pressure and lower temperature. Carbon dioxide is separated from the low pressure, lower temperature, combustion product gas after some recuperative recovery of contained heat. A first retentate portion is conducted from the first oxygen selective ion transport membrane to a cathode side of a second oxygen selective ion transport membrane that is operating at conditions effective to transport a second permeate oxygen portion to an opposing anode side. Nitrogen is recovered from a second retentate portion.

In preferred embodiments of this second aspect, the anode side of the second oxygen selective ion transport membrane may be purged with a mixture of steam and a carbon containing fuel gas. The carbon containing compound may be a hydrocarbon delivered at a mass flow rate effective for a stoichiometric surplus of oxygen on combustion with the second permeate oxygen portion. The second retentate portion may be substantially free of oxygen.

In a third aspect, the invention is directed to a process for the cogeneration of carbon dioxide, oxygen, nitrogen and electrical power. A pressurized oxygen-containing first process gas is flowed along a cathode side of a first oxygen selective ion transport membrane that is at operating conditions effective to transport a first permeate oxygen portion from the cathode side to an opposing anode side. A first retentate portion is flowed along a second cathode side of a second oxygen selective ion transport membrane that is at operating conditions effective to transport a second permeate oxygen portion from the second cathode side to an opposing second anode side. Substantially oxygen-free nitrogen remains in a second retentate portion after the second permeate oxygen portion has been removed. Fuel is introduced into the second permeate passage to react with the second permeate oxygen portion to form first combustion products. The heat of reaction generated by the reaction of second oxygen permeate portion and said fuel is removed primarily by heat transfer to the oxygen containing feed stream flowing through a heat exchange passage in that is integral with said second oxygen transport membrane reactor. Design and flow conditions are controlled to maintain said second oxygen selective ion transport membrane within its appropriate operating temperature range from 800 to 1100° C. The first combustion products are flowed along the first anode side and combined with the first permeate oxygen portion to form a second mixture. Heat is removed from the second mixture by transfer of available heat to a pressurized water source thereby forming a pressurized, high temperature, steam and a reduced temperature second mixture. The steam is expanded in a steam turbine to generate electric power. A carbon dioxide-oxygen mixture is separated from the reduced temperature second mixture by condensing out water.

In preferred embodiments of this third aspect, carbon dioxide may be separated from the carbon dioxide-oxygen mixture in a downstream separation using polymeric membranes, pressure or temperature swing adsorption, or partial condensation processes. The steam turbine may be a two-stage steam turbine. The steam turbine may have a first stage exhaust pressure selected to be above to near atmospheric pressure and a second stage exhaust pressure may be at a vacuum pressure of 1 to 5 psia. A portion of the first stage exhaust may be heated and used as additional purge gas for at least one of the membranes.

BRIEF DESCRIPTION OF THE DRAWINGS

Other objects, features and advantages will occur to those skilled in the art from the following description of preferred embodiments and the accompanying drawings in which.

DETAILED DESCRIPTION OF THE INVENTION

This invention may be accomplished by utilizing an oxygen selective ion transport membrane to transport oxygen from a first gas stream flowing along a cathode side of the membrane to a second gas stream flowing along the anode side of the membrane. The second stream may have carbon-containing compounds which, on combustion with the oxygen transported across the membrane, produce a mixture of water and carbon dioxide. The carbon dioxide may be separated from the water.

Figure 1:
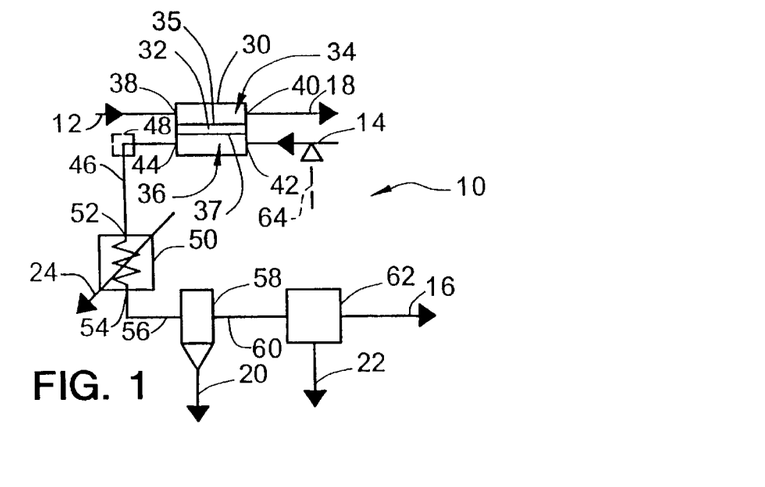
FIG. 1 is a schematic diagram of an embodiment of the invention as a single stage carbon dioxide generation system.

FIG. 1 is a schematic diagram of a first embodiment of a system 10 according to the invention which receives as inputs a feed 12 of oxygen-containing process gas (e.g., air); and a feed 14 of carbon-containing process gas (e.g., a hydrocarbon fuel such as natural gas or methane). The system 10 produces, inter alia, an output gas stream 16 rich in carbon dioxide. Additional outputs may include an oxygen-depleted substantially inert gas stream 18, a ater stream 20, a waste stream 22, and heat 24.

The system 10 includes a OTM reactor 30 including membrane 32. The reactor 30 has a retentate or cathode side 34 adjacent a cathode surface 35 of the membrane 32 and an opposite permeate or anode side 36 adjacent an anode surface 37 of the membrane 32. The oxygen-containing process gas feed 12 is directed to an inlet 38 of the cathode side 34. The oxygen-containing process gas is caused to flow along the cathode side 34 toward an outlet 40 while contacting the cathode surface 35. Simultaneously, the hydrocarbon fuel process gas feed 14 is directed to an inlet 42 on the anode side 36. The hydrocarbon fuel process gas in feed 14 is then caused to contact the anode surface 37 as it flows along the anode side 36 toward an outlet 44. As the oxygen-containing process gas and hydrocarbon fuel process gas respectively flow along the cathode and anode sides, there is a transport of oxygen (a "permeate oxygen portion") from the oxygen-containing process gas on the cathode side to the anode side where such permeate oxygen portion is caused to react with the hydrocarbon fuel process gas in a combustion reaction. Accordingly, due to the transport of oxygen across the membrane 32, the oxygen-containing process gas has become partially or substantially depleted of oxygen and exits the outlet 40. It would be impractical to attempt to remove all the oxygen by reaction without an excessive temperature rise of the reactants, unless a significant amount of steam or other non-reactive gas is added to the fuel and during the anode side. Similarly, the hydrocarbon fuel gas, reacts with the permeate oxygen portion to form combustion products (e.g., carbon dioxide, carbon monoxide and water) which as gas stream 46 exits the outlet 44. The heat of the reaction is absorbed by temperature rise of the fluids passing through the reactor. With a suitable internal heat transfer design of the reactor, as in Gottzmann et al., U.S. Pat. No. 5,820,655, the temperature of the membrane can be maintained within its operating range. The combustion products gas stream 46 may be passed through an optional catalytic converter 48 to more fully complete the combustion process removing carbon monoxide and unburned hydrocarbons. Optionally, steam 64 may be added to the fuel stream 14. This will permit reacting a greater amount of oxygen transferred from the cathode without excessive temperature rise.

The tubular oxygen selective ion transport membranes 32 are typically formed from an inorganic oxide, typified by calcium- or yttrium- stabilized zirconia or analogous oxides having a fluorite or perovskite structure. The oxygen selective ion transport membranes 32 have a nominal thickness of under 5000 microns and are preferably less than 1000 microns thick. The membrane element has the ability to transport oxygen ions and electrons at the prevailing oxygen partial pressure in the temperature range of from 450° C. to about 1200° C. when a chemical potential difference is maintained across the ion transport membrane surface caused by maintaining a positive (i.e., greater than 1) ratio of oxygen partial pressures across the ion transport membrane. This is preferably achieved by reacting transported oxygen with an oxygen-consuming process gas. The oxygen ion conductivity is typically in the range of between 0.01 and 100 S/cm where S is reciprocal ohms (1/ohms).

Suitable materials for the ion transport membrane include perovskites and dual phase metal-metal oxide combinations as listed in Table 1. Because the reactive environment on the anode side of the oxygen-selective ion transport membrane, in many applications, creates very low partial oxygen pressures, the chromium-containing perovskites listed in Table 1 may be preferred materials since these tend to be stable in the low partial oxygen pressure environment. The chromium-containing perovskites are not typically decomposed at very low partial oxygen pressures.

Optionally, a porous catalyst layer, possibly made from the same perovskite material, may be added to one or both sides of the oxygen-transport membrane element to enhance oxygen surface exchange and the chemical reactions on the surfaces. Alternatively, the surface layers of the oxygen-selective ion transport membrane element may be doped, for example, with cobalt, to enhance surface exchange kinetics.

A preferred structure for the tubular elements is a composite where a porous matrix supports a thin membrane film (e.g., as in Thorogood et al. in U.S. Pat. No. 5,240,480).

TABLE 1

Material composition

| | | | |
|---|---|---|---|
| 1. | $(La_{1-x}Sr_x)(Co_{1-y}Fe_y)O_{3-\delta}$ | | ($0 \leq x \leq 1, 0 \leq y \leq 1$, $\delta$ from stoichiometry) |
| 2. | $SrMnO_{3-\delta}$ | | ($0 = x = 1$, $\delta$ from stoichiometry) |
| | $SrMn_{1-x}Co_xO_{3-\delta}$ | | |
| | $Sr_{1-x}Na_xMnO_{3-\delta}$ | | |
| 3. | $BaFe_{0.5}Co_{0.5}YO_3$ | | |
| | $SrCeO_3$ | | |
| | $YBa_2Cu_3O_{7-\beta}$ | | ($0 < \beta \leq 1$) |
| 4. | $La_{0.2}Ba_{0.8}Co_{0.8}Fe_{0.2}O_{2.6}$; | | |
| | $Pr_{0.2}Ba_{0.8}Co_{0.8}Fe_{0.2}O_{2.6}$ | | |
| 5. | $A_xA'_{x'}A''_{x''}B_yB'_{y'}B''_{y''}O_{3-z}$ | | (x, x', x", y, y', y" all in 0–1 range; z from stoichiometry) |
| | where: A, A', A" = from groups 1, 2, 3 and f-block lanthanides; and B, B', B" = from d-block transition metals | | |
| 6. | (a) Co—La—Bi type: | Cobalt oxide | 15–75 mole % |
| | | Lanthanum oxide | 13–45 mole % |
| | | Bismuth oxide | 17–50 mole % |
| | (b) Co—Sr—Ce type: | Cobalt oxide | 15–40 mole % |
| | | Strontium oxide | 40–55 mole % |
| | | Cerium oxide | 15–40 mole % |
| | (c) Co—Sr—Bi type: | Cobalt oxide | 10–40 mole % |
| | | Strontium oxide | 5–50 mole % |
| | | Bismuth oxide | 35–70 mole % |
| | (d) Co—La—Ce type: | Cobalt oxide | 10–40 mole % |
| | | Lanthanum oxide | 10–40 mole % |
| | | Cerium oxide | 30–70 mole % |
| | (e) Co—La—Sr—Bi type: | Cobalt oxide | 15–70 mole % |
| | | Lanthanum oxide | 1–40 mole % |
| | | Strontium oxide | 1–40 mole % |
| | | Bismuth oxide | 25–50 mole % |
| | (f) Co—La—Sr—Ce type: | Cobalt oxide | 10–40 mole % |
| | | Lanthanum oxide | 1–35 mole % |
| | | Strontium oxide | 1–35 mole % |
| | | Cerium oxide | 30–70 mole % |
| 7. | $Bi_{2-x-y}M'_xM_yO_{3-\delta}$ | | ($0 \leq x \leq 1, 0 \leq y \leq 1$, $\delta$ from stoichiometry) |

TABLE 1-continued

Material composition where: M'= Er, Y, Tm, Yb, Tb, Lu, Nd, Sm, Dy, Sr, Hf, Th, Ta, Nb, Pb, Sn, In, Ca, Sr, La and mixtures thereof; and
M = Mn Fe, Co, Ni, Cu and mixtures thereof 8. $BaCe_{1-x}Gd_xO_{3-x/2}$
  where, x equals from zero to about 1.
9. One of the materials of $A_sA'_tB_uB'_vB''_wO_x$ family whose composition is disclosed in U.S. Pat. No. 5,306,411 (Mazanec et al.) as follows:
  A represents a lanthanide or Y, or a mixture thereof;
  A' represents an alkaline earth metal or a mixture thereof;
  B represents Fe;
  B' represents Cr or Ti, or a mixture thereof;
  B" represents Mn, Co, V, Ni or Cu, or a mixture thereof; and,
  s, t, u, v, w, and x are numbers such that:
  s/t equals from about 0.01 to about 100;
  u equals from about 0.01 to about 1;
  v equals from zero to about 1;
  w equals from zero to about 1;
  x equals a number that satisfies the valences of the A, A', B, B', B" in the formula;
  and,
  $0.9 < (s + t)/(u + v + w) < 1.1$
10. One of the materials of $La_{1-x}Sr_xCu_{1-y}M_yO_{3-\delta}$ family, where:
  M represents Fe or Co;
  x equals from zero to about 1;
  y equals from zero to about 1;
  δ equals a number that satisfies the valences of La, Sr, Cu, and M in the formula.
11. One of the materials of $Ce_{1-x}A_xO_{2-\delta}$ family, where:
  A represents a lanthanide, Ru, or Y; or a mixture thereof;
  x equals from zero to about 1; and
  δ equals a number that satisfies the valences of Ce and A in the formula.
12. One of the materials of $Sr_{1-x}Bi_xFeO_{3-\delta}$ family, where:
  A represents a lanthanide or Y, or a mixture thereof;
  x equals from zero to about 1; and
  δ equals a number that satisfies the valences of Ce and A in the formula.
13. One of the materials of $Sr_xFe_yCo_zO_w$ family, where:
  x equals from zero to about 1;
  y equals from zero to about 1;
  z equals from zero to about 1; and
  w equals a number that satisfies the valences of Sr, Fe and Co in the formula.
14. Dual phase mixed conductors (electronic/ionic):
  $(Pd)_{0.5}/(YSZ)_{0.5}$
  $(Pt)_{0.5}/(YSZ)_{0.5}$
  $(B\text{—}MgLaCrO_x)0.5(YSZ)_{0.5}$
  $(In_{90\%}Pt_{10\%})_{0.6}/(YSZ)_{0.5}$
  $(In_{90\%}Pt_{10\%})_{0.5}/(YSZ)_{0.5}$
  $(In_{95\%}Pr_{2.5\%}Zr_{2.5\%})_{0.5}/(YSZ)_{0.5}$
  Any of the materials described in 1–13, to which a high temperature metallic phase (e.g., Pd, Pt, Ag, Au, Ti, Ta, W) is added.

The oxygen selective ion transport membranes have a specific volume that varies during start-up, steady-state operation and shut down of the chemical reactor. Non-uniform variations in the specific volume introduces strains to the membrane that, if sufficiently severe, will cause fracture. Two sources of volume change are thermal expansion due to temperature changes and compositional strain due to local oxygen potential.

Advantageously, the reactor 30 and the associated gas feeds are maintained under conditions such that there exists a stoichiometric surplus of oxygen on combination of the permeate oxygen portion with the hydrocarbon fuel gas (i.e., the reactor is run in a slightly fuel-lean condition such as with a surplus of about 1 to 10 molar % oxygen). Where the oxygen-containing process gas is air, the oxygen-depleted substantially inert gas in stream 18 will consist essentially of nitrogen with argon and other trace gases and impurities largely preserved from the input air.

The combustion products gas stream 46 is directed to a cooler 50. Cooler 50 may actually consist of a recuperative cooler which transfers heat from the combustion products to incoming stream 12 or generates superheated steam for purge purposes and a condenser in which most of the steam contained in the stream is condensed. A cooled combustion products stream 56 with most of the contained water in liquid form exits the outlet 54 and is directed to a coalescer-separator 58 which separates liquid water from the cooled combustion gas stream 56, discharging such water as the water stream 20 and discharging the remaining non-condensed portion as stream 60. The stream is substantially free of liquid water but is water vapor saturated. Stream 60, which is relatively rich in carbon dioxide, is directed to a purifier 62 which produces substantially pure carbon dioxide as the output gas stream 16 and outputs the remainder of the gas from the dried stream 60 as the waste stream 20. The waste stream 20 may typically contain a minor amount of unreacted fuel and impurities such as nitrogen which entered with the fuel stream 14 and may be disposed of in a number of ways including venting to atmosphere, directing to an incinerator or used in other process steps.

Optionally, a steam feed 64 may be joined with the hydrocarbon fuel gas feed 14 either upstream of the inlet 42 or within the reactor 30. The diluting of the hydrocarbon fuel with steam aids in thermal management (e.g., maintaining an effective temperature for the desired membrane operation) and, furthermore, the steam can serve as a purge gas. The difference in the total pressure (i.e., the sum of all partial pressures) across the membrane places a mechanical stress on the membrane. When the total pressure difference exceeds a maximum, the membrane may rupture or there may be other damage. One advantage of the use of a purge gas is to reduce the total pressure difference across the membrane. For a given net total pressure difference (if any) across the membrane 32, the purge gas allows for a decrease in the oxygen partial pressure on the permeate side of the membrane, thereby increasing the difference in oxygen partial pressures between the cathode and anode sides (and their associated ratios) thereby increasing oxygen flux. The purge also serves to remove the oxygen from the vicinity of the anode surface of the membrane (thereby lowering the effective local oxygen partial pressure at the anode surface). Among the advantages of using a steam purge (rather than another purge gas) in the system 10 is that water is easily separable from carbon dioxide by condensation and already constitutes a significant product of the reaction on the retentate side 36. The steam is condensed and then separated out by the coalescer-separator 58 which may be provided in a correspondingly greater capacity than would be present absent the steam purge.

Figure 2:
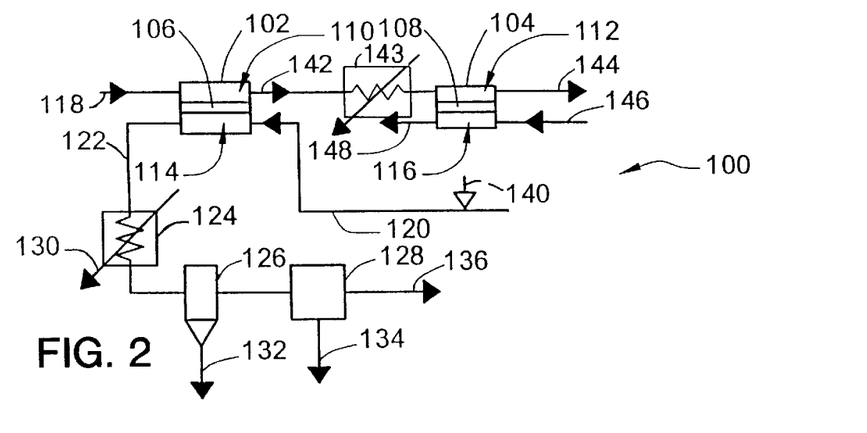
FIG. 2 is a schematic diagram of an embodiment of a two-stage carbon dioxide generation system.

FIG. 2 shows one example of a system 100 configured for a two-stage reactive purge process which produces carbon dioxide. The system 100 features first and second reactors 102, 104, each having a respective OTM 106, 108 separating a cathode side 110, 112 from an anode side 114, 116. The oxygen-containing gas (e.g., air) feed 118 is directed to an inlet on the cathode side 110 of the first reactor 102 and the air is caused to contact the cathode surface of the membrane 106 as it flows along it. A fuel feed 120 is directed to an inlet on the permeate side 114 and the fuel caused to contact the anode surface of the membrane 106 as it flows along it. The fuel is reacted with a permeate oxygen portion transported across the membrane 106 from the cathode side 110 to the anode side 114. The resulting combustion products exit an outlet of the anode side 114 as stream 122. The cooler-condenser 124, separator-coalescer 126, and purifier 128 may treat the combustion products stream in similar fashion as do the cooler-condenser 50, separator-coalescer 58 and purifier 62 of the system 10 of FIG. 1. This results in system outputs of heat 130, water 132, waste 134, and carbon dioxide 136.

In one preferred mode of operation, the first reactor 102 is run under operating conditions selected to maximize the yield of carbon dioxide on the anode side 114. As in the system 10 of FIG. 1, this may include use of a steam or other gases as purge 140. In general, the need to maximize carbon dioxide yield by operating at a lean fuel-oxygen ratio as well as thermal management constraints will inhibit the removal of substantially all oxygen from the air feed 118. Thus, the stream 142 of oxygen-depleted gas exiting an outlet of the cathode side 110 will contain less oxygen than the feed 118 but more than would be regarded as a desired contaminant level. Accordingly, the exit stream 142 is directed to an inlet of the cathode side 112 of the second reactor 104. This partially oxygen-depleted gas is cooled in heat exchanger 143 and is made to contact cathode surface of the membrane 108 as it flows along it, during which contact a substantial portion of the residual oxygen is transported across the membrane to the anode side 116. The resulting more highly oxygen-depleted gas exits the cathode side 112 as an inert products stream 144. On the anode side 116, a reactive purge gas feed 146 is directed to an inlet of the anode side 116. The reactive purge gas includes at least one carbon-containing component. Examples of possible fuels include natural gas or available low BTU gases such as PSA tail gas. The reactive purge gas reacts with the oxygen transported across the membrane 108 (the second permeate oxygen portion) producing a waste stream 148 exiting the anode side 116. Advantageously, the second reactor 104 is run under fuel-rich conditions to facilitate maximum transport of oxygen across the membrane 108 and thus maximum oxygen depletion of the inert product stream 144. Because of this and depending on the source for the reactive gas the waste stream 148 may have a high proportion of unburned fuel, and other contaminants (i.e., nonreacting gases other than carbon dioxide and water). Because of such contaminants and in further view of the relatively small size of the waste stream 148 relative to the combustion products stream 122, it may be inefficient to extract carbon dioxide from the waste stream 148 and the waste stream 148 may be vented or otherwise disposed of.

One optional feature of such a system is the use of diluents added to the anode sides of the first and/or second reactors for purposes of thermal management. Such diluents could include steam or a recycled waste stream such as the waste stream 134 from the purifier 128.

An optional modification of the system would be to utilize an electrically driven membrane in place of the membrane 108 of the second reactor 104. This might advantageously occur if the oxygen transfer duty of the second reactor was sufficiently small so that electric power consumption is moderate. Electrically driven systems employ an ion only conducting membrane which is coated with electrodes both on the anode and cathode sides. The electrodes are connected to a power source which imposes an electrical potential (voltage) across the membrane to pump oxygen from a lower partial pressure on the cathode to higher partial pressure on the anode.

Figure 3:
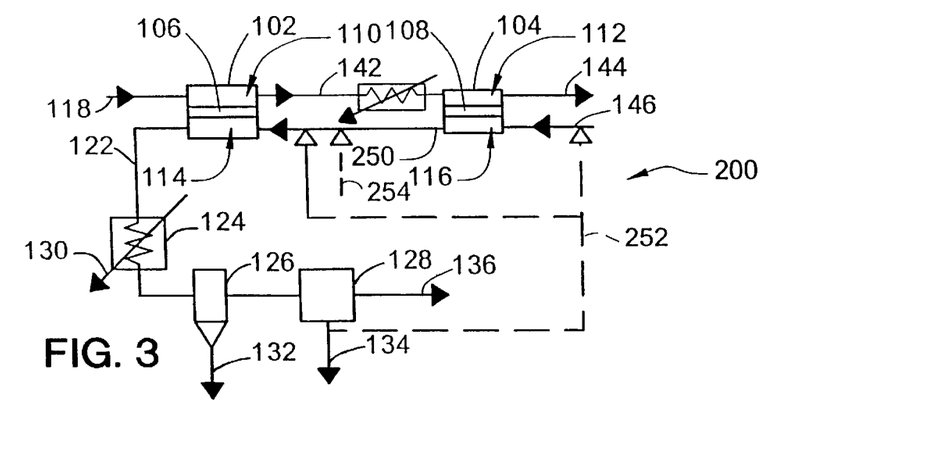
FIG. 3 is a schematic diagram of an alternate embodiment of a two-stage carbon dioxide generation system.

FIG. 3 shows an alternate two-stage system 200 having a configuration largely similar to the system 100 of FIG. 2. Like components and aspects of the system 200 relative to the system 100 are designated with similar reference numerals. A distinction between the two systems lies in the output of the anode side 116 of the second reactor 104 and the input to the anode side 114 of the first reactor 102. In the system 200, a reaction product stream 250 exiting the anode side 116 of the second reactor 104 is directed as an input to the anode side 114 of the first reactor 102. This arrangement has advantages, if fuel stream 146 is relatively free of inerts and contaminants, in that it permits running very fuel rich in reactor 116 to assure removal of all residual oxygen from the retentate stream 144, in that the combustion products generated in 116 provide additional purge gas volume for reactor 114, and in that, additionally, total carbon dioxide yield may be increased due to the absence of lost carbon in the waste stream 148 of the system 100.

Furthermore, an additional purge 254 such as steam, fuel (e.g., methane or methane-containing gases such as natural gas) or combinations thereof may be introduced to the stream 250. Such direction of a diversion 252 may allow for an increased conversion of hydrocarbons and partial oxidation products since dilution of the fuel by nonreacting gases provides additional cooling capacity.

Figure 4:
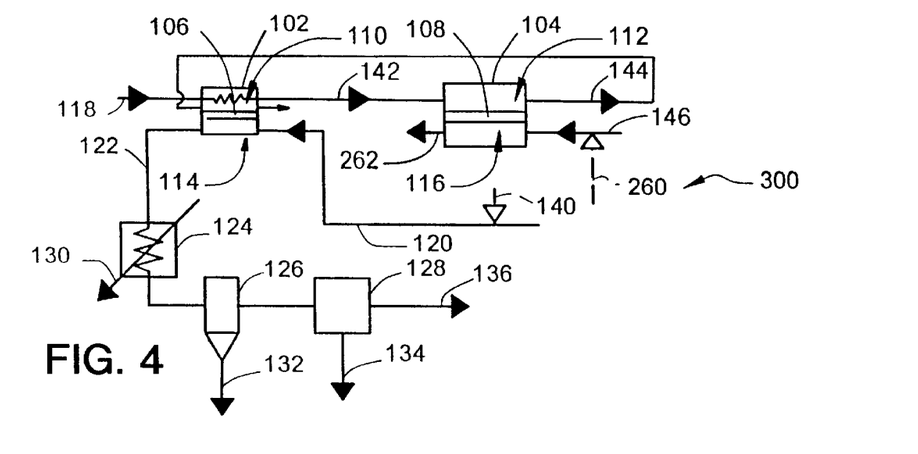
FIG. 4 is a schematic diagram of an embodiment of the invention as a two-stage carbon dioxide generation system with synthesis gas production.

FIG. 4 illustrates an optional two-stage reactive purge process for the production of syngas as well as carbon dioxide and nitrogen. An exemplary system 300 has a configuration largely similar to the system 100 of FIG. 2. Like components and aspects of the system 300 relative to the system 100 are designated with similar reference numerals. For the production of syngas, the second stage or reactor 104 is advantageously larger than the first stage 102 which produces carbon dioxide. Steam including optional product recycle gas 260 is combined with the hydrocarbon gas in feed 146. A reforming catalyst, such as nickel, may be installed on the permeate side of the reactor. As a result, syngas is produced by a combination of partial oxidation and reforming reactions. By controlling the steam to hydrocarbon ratio and the amount of oxygen transferred, the exothermic heat of reaction of the partial oxidation reaction and the endothermic heat of the reforming reaction can be arranged to be close to balancing to ease thermal management of reactor operation. If a high hydrogen to carbon monoxide ratio is required for the syngas, the steam to fuel ratio is increased to produce more hydrogen. In this case, the overall reaction requires heat addition and it can be advantageous to combine reactors 114 and 116 into a single unit as is disclosed in commonly-assigned co-pending application Ser. No. 09/143,974, filed Aug. 31, 1998. Conversely, if a lower hydrogen to carbon monoxide ratio is required in the syngas, the steam fuel ratio is reduced and the overall reaction becomes exothermic. In this case the fluids have to be cooled prior to entering the reactor 116 to provide a heat sink for the removal of the heat of reaction. The output 262 may be subjected to further downstream processing such as removal of excess $CO_2$, unreacted fuel, water and inert components. Typically part of the treated product stream is recycled.

As syngas is generally regarded as more commercially valuable than is carbon dioxide, the primary purpose of such a plant would be production of syngas. Reactor 114 in this case produces heat to elevate feed streams to reactor 116 to their required inlet temperature by complete combustion of fuel stream 120 which also generates by-product carbon dioxide. Locations requiring significant process heat below 1000° C. may favor optimization of the system for generating heat and producing a relatively higher proportion of carbon dioxide than would otherwise be preferred. Advantageously, the first stage should extract and react enough oxygen to provide sufficient energy for heating the inlet streams to the second stage. This may result in a preferred removal of about 10% to about 25% of the oxygen in the feed 118 by the first stage for the production of carbon dioxide. The remainder (or substantially the remainder) of the oxygen is removed in the second stage to produce syngas.

Figure 5:
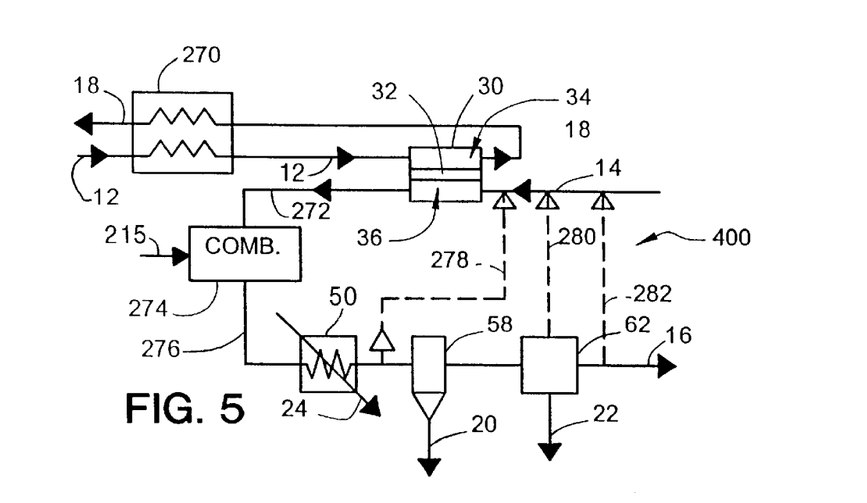
FIG. 5 is a schematic diagram of an embodiment of the invention utilizing separate membrane reactor and combustion units.

FIG. 5 shows an alternate embodiment 400 of a system for the production of carbon dioxide. Relative to the system 10 of FIG. 1, the system 400 removes the combustion process from the OTM reactor to a separate combustion unit. Like components and aspects of the system 400 relative to the system 10 are designated with similar reference numerals. In the exemplary embodiment 400, the air feed 12 and inert gas stream 18 pass through a heat exchanger 270 for transferring heat from the inert gas stream to the air feed and raise its temperature to OTM operating temperature. In this case no fuel is fed to the anode of reactor 36 and output stream 272 from the anode side 36 will largely be oxygen and optionally include noncombustible gases, e.g., steam, as purge gases on the anode. Stream 272 proceeds from the outlet of the anode side to a combustor 274 in which it is reacted with fuel stream 275. The resulting products of combustion stream 276 (containing, e.g., primarily steam and carbon dioxide) exit the combustor and may be directed to the cooler-condenser 50, coalescer-separator 58, and purifier 62 as in the embodiment 10. Alternately, fuel can be fed to the anode and the system operated as a two-stage combustor. In this case, fuel stream 14 is insufficient to react with all the permeating oxygen on the anode of 36 and output stream 272 will contain a mixture of oxygen and products of combustion. The oxygen in stream 272 will react with fuel in combustor 274 as before. An advantage of this system is that it reduces the heat duty as well as the operating temperature of heat exchanger 270 and, compared to the single stage OTM combustor of FIG. 1, substantially eases the thermal management of this unit since energy generation in reactor 36 has been reduced.

Optionally, prior to entering the inlet of the anode side 36, feed 14 may be joined by one or more streams 278, 280 and 282. The stream 278 represents a recycle of a portion from the combusted gas stream 276. The stream 280 represents a recycle of the waste from the purifier 62 and the stream 282 represents a recycle of a portion of the carbon dioxide stream 16. For simplicity's sake, the required heat exchangers and recycle compressors are not shown in the figure. Optionally, heat 24 rejected by the cooler 50 may be utilized to preheat any of the feed streams (e.g., 12 and 14) by means of a heat exchanger (not shown).

Figure 6:
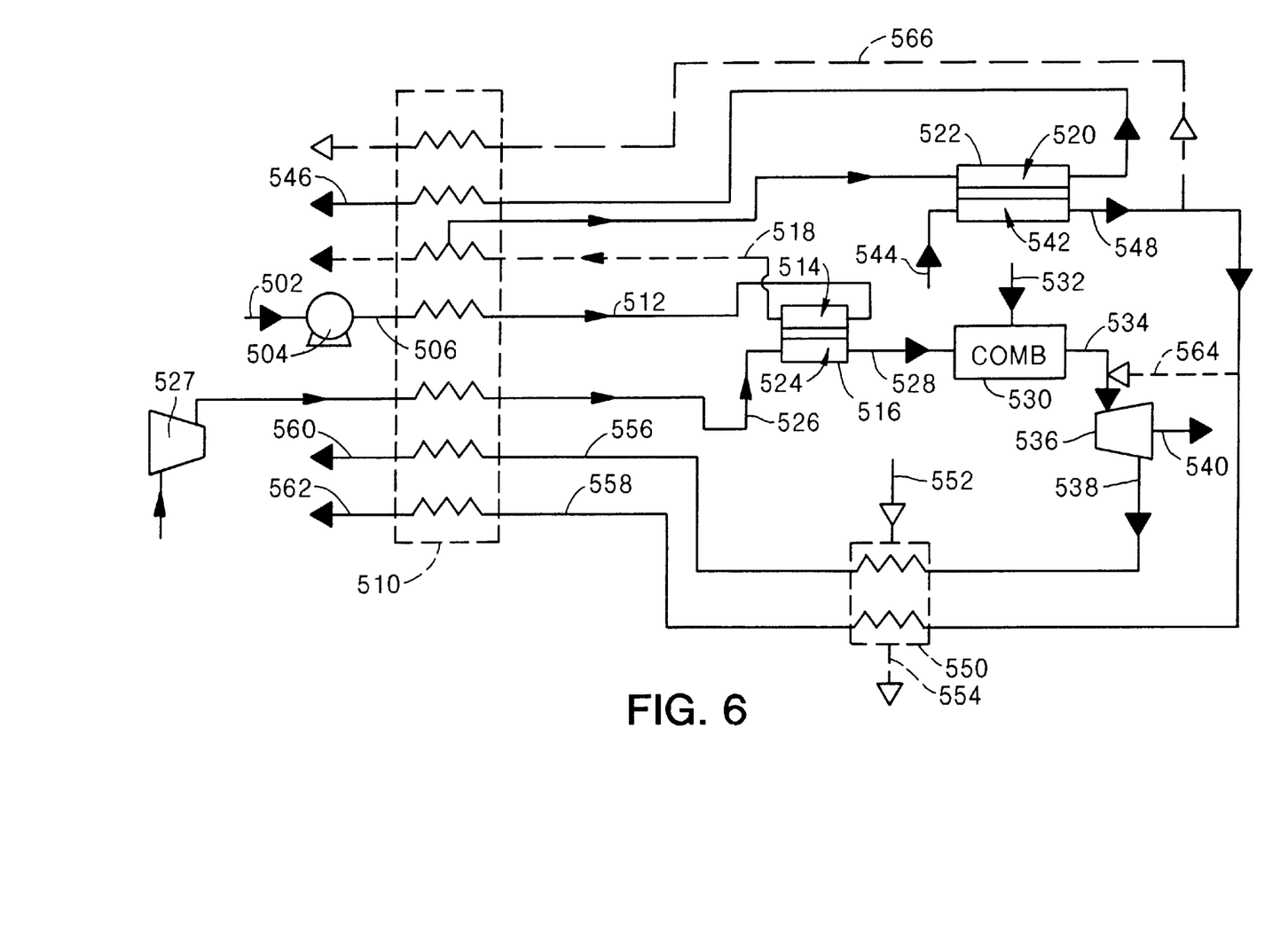
FIG. 6 is a schematic diagram of an embodiment of the invention which integrates production of carbon dioxide with production of power, steam and nitrogen.

FIG. 6 shows an exemplary embodiment 500 of a system which integrates carbon dioxide, nitrogen, steam and power production utilizing a regenerative Brayton cycle. An air feed 502 directs air to the inlet of a compressor 504 which raises the pressure (and temperature) of the air. The output stream 506 of the compressor contains air at a higher pressure than at the air feed 502. The output stream 506 is directed to a heat exchanger 510 where it is further heated to provide an input stream 512 to the cathode side 514 of a OTM reactor 516. If reactor 516 is purged by a noncombustible gas, i.e. $CO_2$ only or steam plus $CO_2$, the temperature of stream 512 must be at OTM operating temperature (700 to 1000° C.). However most advantageously the anode of reactor 516 is at least partially reactively purged. In this case the inlet temperature of stream 512 must be below the operating temperature of the OTM to provide a heat sink for absorbing the heat of reaction from the anode side combustion of fuel. An output stream 518 exiting an outlet of the cathode side 514 is oxygen-depleted and, thus, relatively nitrogen-enriched. The output stream 518 is cooled in heat exchanger 510 and then directed to the cathode side 520 of a second reactor 522.

The anode side 524 of the first reactor 516 is purged with a feed 526 of pressurized carbon dioxide and, most advantageously, also fuel entering through an inlet to the anode side. The carbon dioxide stream is a recycle stream separated from stream 560 and compressed in compressor 527. Exiting an outlet of the anode side 524 is an oxygen-enriched output gas stream 528 containing the input carbon dioxide from feed 526, products of combustion, if reactively purged and the permeate oxygen portion transported across the reactor 516. This stream 528 is then directed to a combustor 530 where it is reacted with a fuel from a fuel feed 532. The mass of recycled $CO_2$, has to be sufficiently large to permit complete combustion of all the contained oxygen without exceeding the permissible maximum inlet temperature for gas turbine 536. Stream 534, comprising $CO_2$ and products of combustion, exits the combustor 530 and is directed to an inlet to the turbine 536. The turbine 536 expands stream 534 which after expansion leaves as turbine exhaust stream 538. Mechanical power 540 is extracted by this process.

The retentate stream 518 leaving reactor 514 is partially cooled in heat exchanger 510 and then introduced to the cathode side 520 of reactor 522 where residual oxygen is removed by a reactive purge to produce a substantially oxygen free nitrogen stream which can be recovered as product 546 after extraction of useful heat in heat exchanger 510. The input to the permeate side 542 of the second reactor 522 is provided by a feed 544 of optional recycled carbon dioxide and a hydrocarbon fuel. The second reactor 522, functioning essentially as a Deoxo reactor transfers the remaining oxygen from the feed 518, from the cathode side 520 to the anode side 542 producing an oxygen-depleted inert gas stream 546 exiting from the outlet of the cathode side 520. An output stream 548 exits an outlet of the anode side 542 and consists essentially of recycled carbon dioxide and products of combustion resulting from the combustion of the fuel contained in the feed 544 and possibly a small portion of the oxygen transferred from the cathode of the reactor 522. The streams 548 and 538 contain useful quantities of heat. These streams may be directed through a steam generator 550 which receives an input feed of water 552 which is converted into a steam output 554 via transfer of heat from the streams 538 and 548. The steam 554 may be directed to a Rankine cycle engine for production of further power. Streams 538 and 548 exit the steam generator 550 as streams 556 and 558, respectively, are cooled further, water is condensed out from the streams and $CO_2$ recovered and purified. Alternatively, hot streams 538 and 548 may be directed to the heat exchanger 510 where heat is extracted for pre-heating the stream 506 and other feed streams to the system. The streams 556 and 558 then leave the heat exchanger 510 as streams 560 and 562, which contain substantial quantities of carbon dioxide in addition to any residual water and unburned fuel. These may be subject to further purification/recovery of carbon dioxide.

There may be a number of optional diversions of various streams. These diversions are made for various purposes including purging and thermal management. For example, a stream 564 may divert a portion or all of the gas in the stream 548 to join with the stream 534 as an input to the turbine 536 to increase the mass flow through the turbine. A portion of the gas in the stream 548 as stream 566 may also or alternatively be delivered to the heat exchanger 510 where heat is extracted to preheat the gas in stream 506. This diverted gas will typically contain significant quantities of carbon dioxide in addition to water and possibly residual fuel or oxygen and may itself be subjected to further purification for carbon dioxide recovery.

In various alternative configurations, the combustor 530 and first reactor 516 may be combined into a single unit. Yet another option would be to combine both reactors 516 and 522 with the combustor into a single unit.

A startup supply of carbon dioxide will be required as carbon dioxide is used as the working fluid in the turbine. Once the system is running, it will produce an excess of carbon dioxide so that the process may continue with the net extraction/recovery of carbon dioxide. One advantage of the system is relatively low $NO_x$ emissions which are significant in other combustion processes using air as the oxidant. The oxidant for the combustor 530 is the permeate oxygen portion transported across the reactor 516. This is mixed with the carbon dioxide from the feed 526 but does not contain significant quantities of nitrogen. Therefore, its combustion does not produce $NO_x$ beyond minor quantities from any small nitrogen contamination of the fuel.

Figure 7:
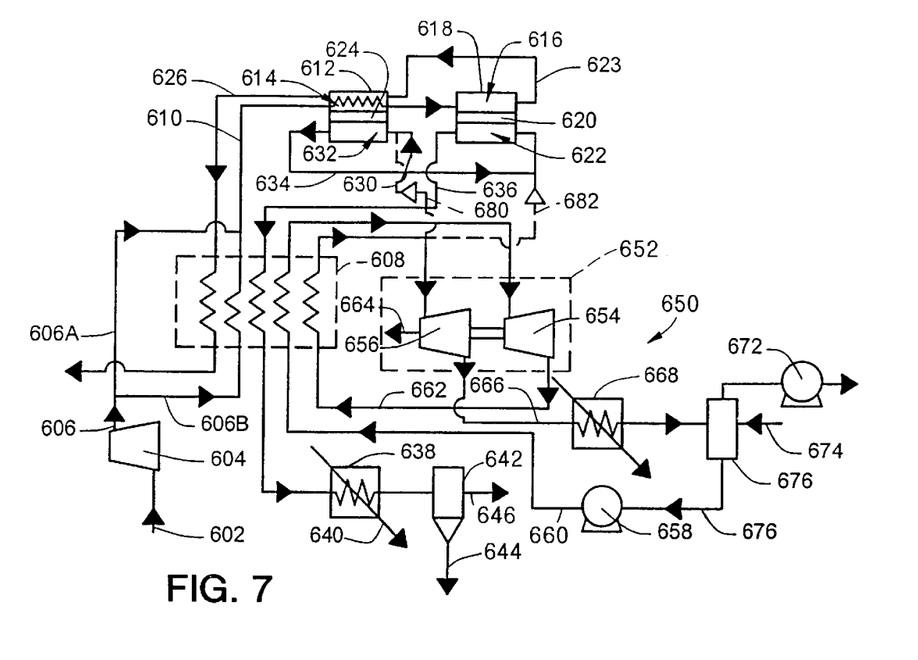
FIG. 7 is a schematic diagram of an embodiment of the invention which combines the production of carbon dioxide with the production of oxygen, nitrogen and power.

FIG. 7 shows an exemplary embodiment 600 of a system which integrates a Rankine cycle steam power plant and a mixed/ionic conducting membrane reactor to produce carbon dioxide, oxygen, nitrogen and power. An air feed 602 directs air to the inlet of a compressor 604 which raises the pressure (and temperature) of the air. A compressed air stream 606 exits an outlet of the compressor at an elevated pressure of, for example, approximately 100 to 250 psig. The compressed air stream 606 may be divided into first and second air streams 606A and 606B. The first air stream 606A represents the majority of the compressed air stream 606 (e.g., about 60% to about 90% by massflow). The second air stream 606B contains the remainder, a minority of the air in output stream 606. The second air stream 606B is passed through a heat exchanger 608 where it is heated as described in further detail below. Downstream of the heat exchanger 608 the first and second air streams 606A and 606B join as a combined air stream 610. Valves in streams 606A and 606B proportion the two respective streams to control the inlet temperature to reactor 612 to the level required for absorbing the heat from the anode side reaction without exceeding the maximum OTM operating temperature. The combined air stream 610 is passed through separate heat exchange passage on the cathode side 614 of the OTM reactor 612 in a heat exchange relation but sealed against fluid or chemical communication with a retentate gas flowing on the cathode side 614.

Upon exiting the reactor 612, the combined air stream 610 is at a substantially elevated temperature having received heat from the reaction on the anode side which heat is transferred by radiation from the OTM and convection through the retentate gas stream. A suitable design for such a reactor heater is shown in U.S. Pat. No. 5,820,655 by Gottzmann et al. An exemplary temperature range for such heated air is from about 700 to about 1000° C., with a preferred temperature of about 850 to 950° C.). The combined air stream 610 is then directed to an inlet in the cathode side 616 of an OTM separator 618. The air delivered to the cathode side 616 contacts the cathode side surface of the membrane 620 of the OTM separator 618 as it flows along it. A portion of oxygen contained in combined air stream 610 is transported across the membrane 620 to the anode side 622. The remainder of the gas from the combined air stream 610 exits an outlet of the cathode side 616 as a partially oxygen-depleted stream 623. By way of example, the stream 623 has an oxygen content of about 7% by volume. The partially oxygen-depleted stream 623 is then directed to an inlet of the cathode side 614 of the first reactor 612. The partially oxygen-depleted stream 623 then contacts the cathode side surface of the membrane 624 as it flows along the cathode side 614 so that substantially the remainder of the oxygen from the original air feed 602 is transported across the membrane 624 as a permeate oxygen portion.

A resulting oxygen-depleted stream 626 exits an outlet of the cathode side 614, consisting essentially of the non-oxygen components of the original air feed 602. The oxygen-depleted stream 626 is then directed through the heat exchanger 608 to transfer heat to the second air stream 606B and to the turbine working fluid described below. Downstream of the heat exchanger, the oxygen-depleted stream 626 can exit the system as a product stream consisting essentially of oxygen-free nitrogen and argon with residual impurities. To fuel the system, a fuel feed 630 containing a hydrocarbon fuel is directed to an inlet to the anode side 632 of the first reactor 612. The fuel in the fuel feed 630 reacts with the permeate oxygen portion transported across the membrane 624 in a combustion process which produces heat and combustion products, namely carbon dioxide and water (steam). These exit an outlet of the anode side 632 as a combustion products stream 634.

The combustion products stream 634 is directed to an inlet to the anode side 622 of the OTM separator 618 where it serves as a purge gas flowing countercurrently to the cathode side gas. An oxygen-enriched stream 636 exits an outlet of the anode side 622 containing a combination of combustion products from stream 634 and the permeate oxygen portion transported across the membrane 620. The oxygen-enriched stream is directed to the heat exchanger 608 for a transfer of heat to the second air stream 606B and to the turbine working fluid. After exiting the heat exchanger 608, the oxygen-enriched stream is directed to a condenser 638 which extracts further heat 640 and condensed water and thereafter to a coalescer-separator 642 which extracts the water from the oxygen-enriched stream as a water output 644 and leaves a remaining output stream 646 consisting essentially of carbon dioxide and oxygen. The remaining output 646 may be directed to additional process units for separating the carbon dioxide from the oxygen therein. In an exemplary embodiment, the remaining output stream 646 has an oxygen to carbon dioxide ratio of about 4:1.

In addition to heating the second air stream 606B, the heat recovered from the oxygen-depleted stream 626 and the oxygen-enriched stream 636 in heat exchanger 608 is used to power the Rankine cycle steam power plant. The power plant 650 includes a two stage steam turbine 652 having first and second stages 654 and 656, respectively. A pump 658 pressurizes an input stream of water 676. Stream 660 then enters a boiling and superheating passage of heat exchanger 608 which converts the water to superheated steam due to heat transfer from the streams 626 and 636. Upon exiting the heat exchanger, the stream 660 is directed to an inlet to the first turbine stage 654. In the first stage, the steam in the stream 660 is expanded and work extracted. The steam from the stream 660 exits an outlet of the first stage 654 as an output stream 662 which is then directed back into the heat exchanger to be superheated by heat from the streams 626 and 636. After exiting the heat exchanger, the output stream 662 is directed to an inlet of the second stage 656. The steam from the output stream 662 is expanded in the second stage 656 resulting in the extraction of further work. The work from the first and second stages results in a combined mechanical work output 664. To produce the maximum amount of power, the steam from the output stream 662 exits an outlet of the second stage 656 as a low pressure output stream 666 (e.g., at a pressure of 2 psia). The low pressure output stream 666 is passed through a condenser 668 where vacuum pump 672 removes noncondensible entrained gases. The water output of the condenser 668 is combined with a water makeup feed 674 in stream 676 and recycled to pump 658.

It is advantageous for maximizing recovery of oxygen as well as maximizing partial oxygen pressure driving ratios and thereby minimizing OTM areas, to use at least a portion of superheated steam stream 662 after exiting the heat exchanger 608 as a purge 680 and/or 682 to the respective anode sides 632 and 622 of the reactor 612 and separator 618. Such purges would be associated with an increase in the loads on the condenser 638 and coalescer-separator 642 and result in increased flow of the water output 644. At least a portion of stream 644 can be recycled as water make up to the boiler feed water after suitable treatment.

In an exemplary embodiment of the system 600, the system and its components are dimensioned to provide a power output 664 of about 3,500 kW. At such a power, exemplary output of the oxygen-depleted stream 626 would be of about 1.2 million normal cubic feet per hour (MNCFH) of nitrogen at an elevated pressure of about 130 psia while the remaining output 646 would contain about 200,000 NCFH of oxygen and 50,000 NCFH of carbon dioxide. Fuel consumption in feed 630 would be of about 50,000 NCFH of natural gas. With a debit for an equivalent amount of nitrogen compression, the combustion of this amount of fuel in a straight Rankine cycle power plant would yield about 4,000 kW.

The foregoing system 600 enhances the production of oxygen in the separator 618 via use of combustion products from the reactor 612 to purge the anode side 622 of the separator. Such a purge is advantageous as it results in oxygen-enriched stream 636 consisting essentially of water, carbon dioxide, and oxygen which are relatively easy to separate from each other, with the water being condensed out and then the carbon dioxide separated from the oxygen using adsorption, absorption, or membrane separation. Optionally, a steam purge such as diversion 682 can be used in place of the combustion products purge. Such a steam purge would eliminate the need to separate carbon dioxide from oxygen in the resulting oxygen-enriched stream. However, it would result in reduced power production.

In the exemplary embodiment of the system 600, with the exception of the relatively small amount of heat introduced via compressors, the exclusive source of heat is the combustion of the fuel from feed 630 on the anode side 632 of the reactor 612.

Figure 8:
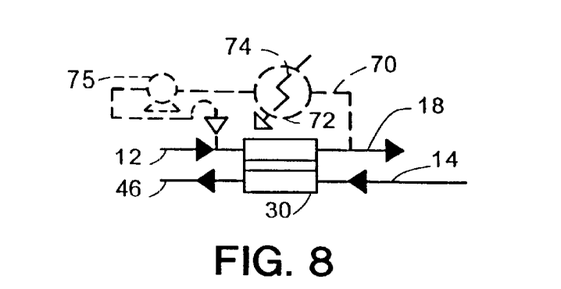
FIG. 8 is a schematic diagram of an optional inert gas diversion for controlling oxygen transport and heat generation.

Reactors with high heat transfer coefficients are typically achieved by providing high flow rates and small flow passages (thus yielding a high surface area to volumetric flow ratio). It is important to ensure that the heat transfer is not excessive to avoid quenching the reactor, killing the oxygen transport, and damaging the membrane due to compositional or thermal stress. The limitations in capacity for heat removal mean that, in a typical reactor, only about one third of the oxygen contained in an air stream will be removed in a given pass. A greater amount of oxygen removal generates more heat and requires an additional heat sink. Passing an additional cooling stream through a separate heat exchange passage in the reactor would be one way of accomplishing this. Another way would be to pass excess air through the cathode passage, that is recovering less oxygen percentage-wise from a given mass flow of air or oxygen containing gas mixture. This can be accomplished by cooling and recycling part of the retentate flow as shown schematically in FIG. 8. Here, part of retentate stream 18 is recycled as stream 70 through cooler 72 back to the inlet to the reactor cathode where it joins original air stream 12. Blower 75 is inserted to overcome the pressure drop in the recycle circuit. The scheme increases the mass flow and reduces the oxygen concentration at the separator inlet.

A reduction in the oxygen flux tends to reduce the amount of heat generated. If reduction in heat generation is critical, a membrane with a lower conductivity (therefore reducing oxygen flux) may be substituted. This could have the additional benefit of increased membrane life since the lower conductivity materials, such as chromium containing perovskites tend to be more stable.

Figure 9:
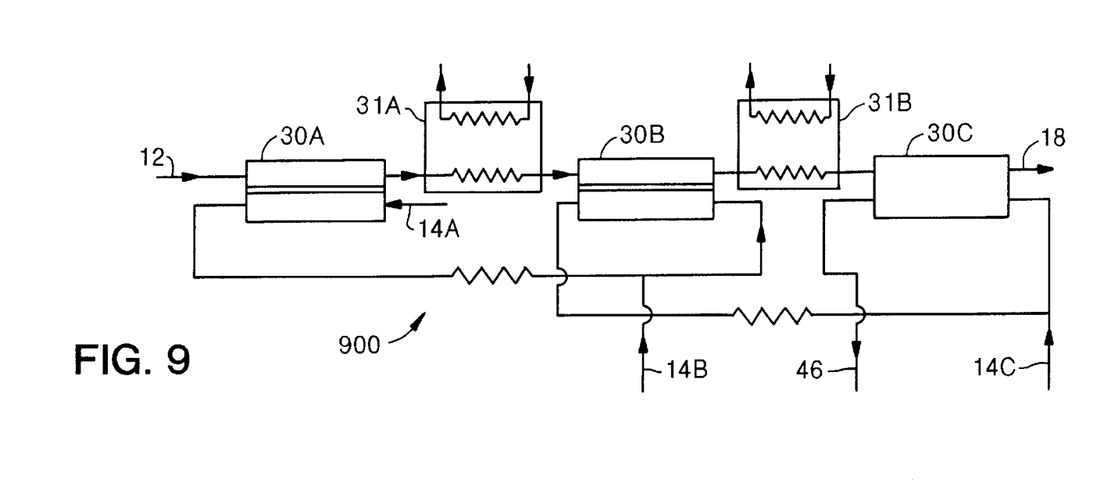
FIG. 9 is a schematic diagram of a multistage reactor system for improved heat removal.

Another way to increase heat removal is to spread the oxygen removal out over two or more stages with cooling between stages. An example of a three stage system 900 is shown in FIG. 9. The illustrated system 900 may have air feeds 12 and multiple fuel feeds 14A, 14B, and 14C, a product stream 46 consisting of primarily of carbon dioxide and steam, and an oxygen-depleted stream 18 consisting primarily of nitrogen as does the system 10 of FIG. 1. The air feed 12 is passed sequentially through the cathode sides of three reactors 30A, 30B, and 30C, transporting a respective permeate oxygen portion across to the anode side of each such reactor and finally emerging from the third reactor 30C as the substantially inert gas stream 18. The heats of reaction from the combustion of fuel on the anode sides are absorbed by temperature rise of the retentate gas stream in each stage. To provide adequate cooling capacity in stages 30B and 30C the retentates exiting 30A and 30B are cooled in heat exchangers 31A and 31B before entering reactors 30B and 30C respectively. Separate fuel streams 14A, 14B, and 14C are sized to assure slightly fuel lean, and therefore complete, combustion in each stage, feed the anodes of all three reaction stages 30A, 30B, and 30C, in each reactor reacting with the associated permeate oxygen portion. The combustion products from preceding stages join the added fuel streams as diluent or purge gas for purging the anodes of successive stages. A combustion product stream 46 exits the outlet of the anode side of the third reactor 30C and is directed to a cooler, condenser, water separator and purifier (not shown) as in the embodiment of FIG. 1.

The advantage of multistage arrangements with interstage retentate cooling is that it permits removal of essentially all of the oxygen from an air stream without need for additional internal reactor cooling. The three reactors 30A–30C need not all be of the same size. For example, the three reactors could be arranged from a smallest 30A to a largest 30C so that the amount of oxygen transported across each reactor and the amount of heat generated in each reactor would be approximately equal for all three reactors. In general countercurrent or cross-countercurrent flow between retentate and anode side fluids is preferred in all reactors to maximize the driving force for oxygen transport.

Figure 10:
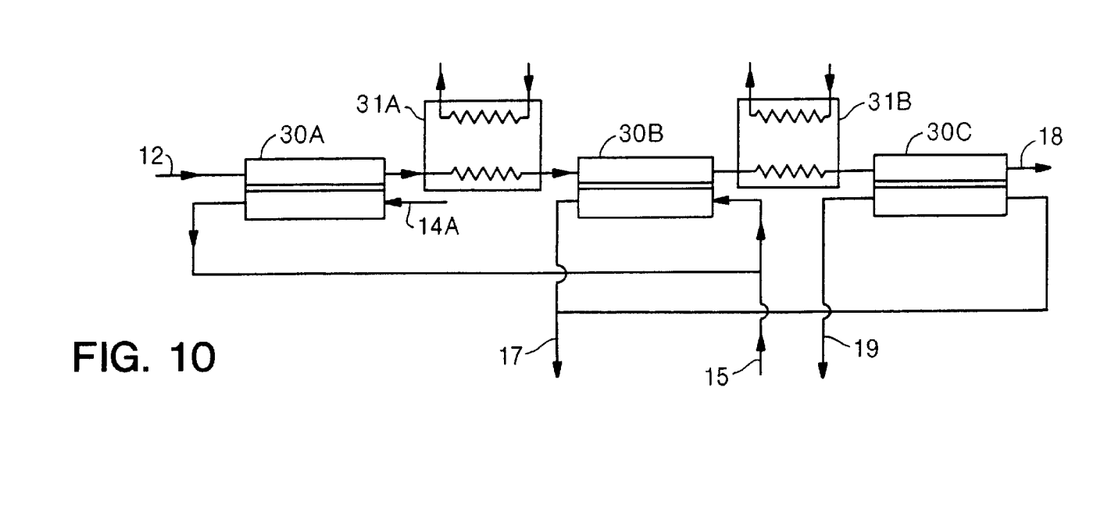
FIG. 10 is a schematic of a multistage reactor system for producing syngas and carbon dioxide with improved heat removal.

Another option is illustrated in FIG. 10. The cathode side flow circuit is identical to that of FIG. 9. All the fuel 14 for the process is introduced to the anode of reactor 30A and steam 15 is added to the fuel stream and optionally also to the anode of reactor 30B. In this case, the reaction will be fuel rich favoring partial rather than complete oxidation in reactors 30A and 30B. As before, the anodes of all three reactors are connected in series so that the products exiting each stage will purge the anode of the succeeding stage. Reforming catalyst may be installed on the anode sides of reactors 30A and 30B. A syngas product stream 17 is withdrawn after reactor 30B from the permeate stream and a product stream 19 consisting primarily of water and $CO_2$ from the permeate discharge of reactor 30C. Both products are directed to downstream separation and purification processes as in other embodiments. Because of the endothermic reforming taking place in reactors 30A and 30B, less heat has to be rejected and heat management is simplified relative to the embodiment. In the foregoing examples the intermediate heat removals can be integrated with the overall process to preheat feed streams or generate required steam.

EXAMPLES

Example 1

In the system 100 of FIG. 2, each ionic/mixed conducting membrane reactor module may be composed of 1000 tubes, each 10 feet long and 1 inch in diameter. The total surface area of the tubes is about 2,618 ft² (calculated as the average of the total area of the cathode side surfaces and the anode side surfaces). The oxygen flux is known to decrease with decreasing oxygen concentration on the cathode side, so there is an estimated oxygen flux of 10 standard cubic feet per hour per square foot (scf/hr/ft²) for oxygen concentrations greater than 7% (the first reactor 102) and an oxygen flux of 5 scf/hr/ft² for oxygen concentrations less than 7% (the second reactor 104). In this case, the two reactors will be the same size and the oxygen concentration will be reduced from 21% to 7% in the first reactor and from 7% to 0% in the second reactor. The total amount of oxygen removed in each module of the first reactor 102 is about 2,150 lb/hr, or 25,800 standard cubic feet per hour (scfh), while the oxygen removed in each module of the second reactor 104 is about 1,070 lb/hr, or 12,900 scfh.

Each first reactor module will consume about 530 lb/hr of methane, producing about 1,470 lb/hr of $CO_2$ and 1,210 lb/hr of $H_2O$. Half of the oxygen that permeates the membrane will form $CO_2$, the other half will form $H_2O$. Assuming 85% recovery of $CO_2$ in purification, the process will produce about 1,250 lb/hr, 20,000 lb/day, 10,890 scfh of $CO_2$. Changing the fuel to another hydrocarbon with a higher carbon/hydrogen ratio would also increase the $CO_2$ production at the same oxygen flux.

Each first stage reactor module produces about 3,350 kW of energy that must be removed to keep it a steady state. Only about 1,400 kW of this heat could be absorbed bringing the feed air and methane up to the reactor temperature assuming methane in fuel feed 120 starts at ambient air in feed 118 at compressor discharge temperature. Therefore additional cooling is required. For instance, a minimum of about 3,900 lb/hr of water would have to be introduced for conversion to 400 psi superheated (1,600° F.) steam or 5,200 lbs. superheated to 800° F. to provide adequate cooling. The steam could be used in a Rankine Power cycle producing about 700 kW of power.

Example 2

An alternative for $CO_2$ production is to use the purge stream from the second ionic/mixed conducting membrane reactor to purge the first reactor in the system 200 of FIG. 3. This process uses the same number of modules as Example 1, consumes the same amount of air as Example 1, and produces the same amount of nitrogen.

However, it produces up to 50% more $CO_2$. The reason for such a dramatic improvement is that this system takes advantage of the fuel converted on the anode of the second ionic/mixed conducting membrane reactor while the process in FIG. 2 does not. It is expected that additional purification would be necessary with this process compared to the process in Example 1.

Example 3

An alternative process involves the use of the second reactor to produce synthesis gas, as in the system 300 of FIG. 4. In this process, the $CO_2$ reactor 102 will be smaller than the synthesis gas reactor 104 and will serve to preheat the oxygen-depleted gas stream 142 fed to the synthesis gas reactor. In this example, the synthesis gas reactor typically runs at a higher temperature (1,800° F. instead of 1,700° F.). The temperature increase reduces the amount of unconverted methane and complete combustion products. The oxygen flux is also expected to increase at the higher temperature. Some of the extra heat can be recovered by heat exchange or by producing steam. Additional heat exchangers will be needed to preheat the inputs to the reactors because the temperature is higher and because the partial oxidation reaction to produce synthesis gas is much less exothermic than the complete combustion reaction to produce $CO_2$.

The reactor module size in this example is the same as in Example 1, with a membrane surface area of about 2,620 ft². The oxygen flux in the $CO_2$ reactor 102 is the same as in Example 1, but the flux in the synthesis gas reactor 104 will be higher because the temperature is higher and the inlet oxygen concentration is higher because less oxygen will be removed by the $CO_2$ reactor. An estimated exemplary average oxygen flux in the synthesis gas reactor is also 10 scf/hr/ft², although it could be higher. It is estimated that the exemplary $CO_2$ reactor removes only 15% of the inlet oxygen, instead of 70% as in Example 1. The oxygen removal in the $CO_2$ reactor is determined by thermal considerations. Synthesis gas is generally a more desirable product than $CO_2$, but it is necessary to produce some $CO_2$ to produce heat to preheat the reactor inputs. Allowing for delta T for heat exchange and some heat loss, it is estimated that 15% of the inlet oxygen will need to be converted to $CO_2$ to provide sufficient heat to run the process. In this case, the synthesis gas reactor will be about seven times as large, or require seven times as many modules of the same size, as the $CO_2$ reactor, assuming the same average flux. The total amount of oxygen removed in each module of the first reactor is still about 2,150 lb/hr, or 25,800 scfh, because the flux is the same. However, there will be much more air flowing through the reactor in this case, providing a bigger heat sink for absorbing the heat of reaction. Each module of the second reactor will also consume 2,150 lb/hr, or 25,800 scfh, because the oxygen flux is the same. More oxygen will be consumed to make synthesis gas, so more modules will be necessary to constitute the synthesis gas reactor than the $CO_2$ reactor.

Each first reactor module will still consume 530 lb/hr of methane and produce about 1,470 lb/hr of $CO_2$ and 1,210 lb/hr of $H_2O$. Assuming 85% recovery of $CO_2$ in purification, the process will produce about 1,250 lb/hr, or 10,890 scfh of $CO_2$ per module.

Assuming 85% recovery of the useful products in purification, each second reactor module will consume about 2,150 lb/hr of methane and produce about 394 lb/hr, 9,500 lb/day, or 75,670 scfh of $H_2$ and 38,450 scfh of CO. In order to consume all of the available oxygen, it would be necessary to have about 6 of these modules in the synthesis gas reactor. It is desirable to configure reactors to enhance heat removal and, thereby, maximize throughput while maintaining membrane temperature sufficiently low to avoid damage to the membrane. Guidelines for accomplishing this are discussed in U.S. Pat. No. 5,820,655 by Gottzmann et al. and in commonly assigned co-pending application Ser. No. 09/089,512, filed Jun. 3, 1998.

As used herein, the term "low grade fuel gases" refers to fuels with a heating value of less than 500 btu/scfh.

The term "slightly fuel lean" indicates 1 to 10% more oxygen than required stochiometrically.

The term "substantially free of oxygen" indicates less than 1% oxygen content by mass.

The term "near atmospheric pressure" indicates 14 to 25 psia.

The term "partial oxidation reaction" indicates a reaction such as $CH_4 + \frac{1}{2}O_2 = CO + 2H_2$ as distinguished from the complete oxidation reaction, $CH_4 + 2O_2 = CO_2 + 2H_2O$, for the example of methane.

The term "module" refers to a shell containing one or more ion transport membrane elements arranged in one or more sections. Unless noted to the contrary hereinafter, a description of operation performed by two or more modules applies to alternative embodiments in which such operations are performed by two or more ion transport membrane sections disposed in a single module.

The term "section" refers to at least a portion of an assembly of one or more ion membrane elements which may be shaped as a tubular, planar or other type of structure.

The term "oxygen selectivity" means that the oxygen ions are preferentially transported across the membrane over other elements, and ions thereof. The solid electrolyte membrane is preferably made from inorganic oxides, typified by calcium- or yttrium-stabilized zirconium or analogous oxides having a fluorite or perovskite structure. Exemplary compositions for such membranes are disclosed in U.S. Pat. No. 5,702,959 (Mazanec, et al.), U.S. Pat. No. 5,712,220 (Carolan, et al.) and U.S. Pat. No. 5,733,435 (Prasad, et al.) all of which are incorporated by reference in their entireties herein. Such membranes may also be used in gas purification applications as described in European Patent Application Publication Number 778,069 entitled "Reactive Purge for Solid Electrolyte Membrane Gas Separation" by Prasad et al., the disclosure of which is incorporated herein by reference in its entirety.

The term "comprising" is used herein as meaning "including but not limited to", that is, as specifying the presence of stated features, integers, steps or components as referred to in the claims, but not precluding the presence or addition of one or more other features, integers, steps, components, or groups thereof.

The illustrated feeds and streams may be contained within and directed by associated conduits which may be substantially coextensive with the schematic depictions of the streams and feeds in the drawings.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A method for the production of carbon dioxide comprising the steps of:

(A) flowing an oxygen-containing first process gas along a first cathode side of a first oxygen selective ion transport membrane that is at operating conditions effective to transport a first permeate oxygen portion from said first cathode side to an opposing first anode side, thereby to form a retentate portion of said oxygen-containing first process gas on said first cathode side;

(B) flowing a retentate stream composed of at least a portion of said retentate portion along a second cathode side of a second oxygen selective ion transport membrane that is at operating conditions effective to transport a second permeate oxygen portion from said second cathode side to an opposing second anode side;

(C) the first oxygen selective ion transport membrane and the second oxygen selective ion transport membrane being arranged in first and second stages and the retentate stream being cooled between said first and second stages;

(D) flowing a carbon-containing second process gas along said first anode side at a mass flow rate effective to provide a stoichiometric surplus of about 1 to 10 molar percent oxygen on combination with said first permeate oxygen portion; and (E) combusting a first mixture of said carbon-containing second process gas and said first permeate oxygen portion such that substantially all of said carbon-containing second process gas is converted into a second mixture of water and carbon dioxide; and separating said carbon dioxide from said second mixture.

2. The method of claim 1 wherein said carbon-containing second process gas is selected from the group consisting of hydrocarbons, carbon monoxide, alcohols and mixtures thereof.

3. The method of claim 2 wherein said hydrocarbon-containing second process gas is selected to be a paraffinic hydrocarbon.

4. The method of claim 2 wherein a purge gas is combined with said carbon-containing second process gas prior to said combusting step.

5. The method of claim 1 wherein:

said retentate portion of said oxygen-containing first process gas is a first retentate portion; and a desired product gas is recovered from a second retentate portion formed at the second cathode side of the second oxygen selective ion transport membrane, wherein said desired product gas is selected from the group consisting of nitrogen, argon and mixtures thereof.

6. The method of claim 5 including the step of flowing a reactive purge gas along said second anode side.

7. The method of claim 6 wherein said reactive purge gas contains a low grade fuel gas.

8. The method of claim 6 wherein said reactive purge gas is diluted by a gas selected from the group consisting of steam and a portion of said second retentate portion.

9. The method of claim 6 wherein said reactive purge gas is reacted with said second permeate oxygen portion in a partial oxidation reaction.

10. The method of claim 9 wherein a product of said partial oxidation reaction is flowed along said first anode side.

11. The method of claim 9 wherein said reactive purge gas consists essentially of methane, natural gas, or mixtures thereof and syngas is recovered as a product of said partial oxidation reaction.

12. A process for the cogeneration of carbon dioxide, nitrogen and electrical power comprising the steps of:

(A) flowing a pressurized oxygen-containing first process gas along a cathode side of a first oxygen selective ion transport membrane that is at operating conditions effective to transport a first permeate oxygen portion from said cathode side to an opposing anode side;

(B) forming a mixture of said first permeate oxygen portion and pressurized carbon dioxide and combusting said mixture to form a combustion product gas;

(C) expanding said combustion product gas in a gas turbine to generate electric power and to reduce pressure and temperature of the combustion product gas;

(D) recovering carbon dioxide from said combustion product gas after reduction of the pressure and temperature thereof;

(E) compressing and recycling a portion of the recovered carbon dioxide to the anode side of said first oxygen selective ion transport membrane;

(F) conducting a first retentate portion from said first oxygen selective ion transport membrane to a cathode side of a second oxygen selective ion transport membrane that is at operating conditions effective to transport a second permeate oxygen portion there through to an opposing anode side; and (G) recovering a nitrogen-containing gas from a second retentate portion.

13. The process of claim 12 including purging said anode side of the second oxygen selective ion transport membrane with an oxygen-receiving compound.

14. The process of claim 13 wherein said oxygen-receiving compound is a hydrocarbon delivered at a mass flow rate effective for a stoichiometric surplus of oxygen on combustion with said second permeate oxygen portion.

15. A process for the cogeneration of carbon dioxide, oxygen, nitrogen and electrical power comprising the steps of:

(A) flowing a pressurized oxygen-containing first process gas along a cathode side of a first oxygen selective ion transport membrane that is at operating conditions effective to transport a first permeate oxygen portion from said cathode side to an opposing anode side;

(B) flowing a first retentate portion along a second cathode side of a second oxygen selective ion transport membrane that is at operating conditions effective to transport a second permeate oxygen portion from said second cathode side to an opposing second anode side;

(C) recovering nitrogen from a second retentate portion;

(D) reacting a fuel with said second permeate oxygen portion to form first combustion products;

(E) flowing said first combustion products along said first anode side and combining said first permeate oxygen portion with said first combustion products to form a second mixture;

(F) removing heat from said second mixture by transfer of available heat to a pressurized water source thereby to form a pressurized, superheated steam and to lower temperature of said second mixture;

(G) expanding said pressurized, superheated steam in a steam turbine to generate electric power; and (H) separating a carbon dioxide-oxygen mixture from said second mixture after having had its temperature lowered by condensing out water.

16. The process of claim 15 further comprising separating out carbon dioxide from the carbon dioxide-oxygen mixture.

17. The process of claim 16 wherein said steam turbine is a two stage steam turbine.

18. The process of claim 17 wherein a first stage steam turbine exhaust pressure of said two stage steam turbine is selected to be above atmospheric pressure and a second stage of said two stage steam turbine exhausts at a pressure of 1 to 5 psia.

19. The process of claim 18 wherein at least a portion of the exhaust of said first stage steam turbine is heated and then used to purge one or both of said first anode side and said second anode side.

* * * * *